US008495937B2

(12) United States Patent
Koegel

(10) Patent No.: US 8,495,937 B2
(45) Date of Patent: Jul. 30, 2013

(54) FENCE SYSTEM FOR A POWER SAW

(75) Inventor: Jan Koegel, Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 12/854,291

(22) Filed: Aug. 11, 2010

(65) Prior Publication Data

US 2012/0036974 A1 Feb. 16, 2012

(51) Int. Cl.
*B23D 25/00* (2006.01)
*B26D 7/06* (2006.01)
*B26D 7/01* (2006.01)

(52) U.S. Cl.
USPC ............................ 83/418; 83/437.2; 83/468.1

(58) Field of Classification Search
USPC ............. 83/418, 437.2, 425, 437, 438, 477.2, 83/435.1, 468.1–468.4, 471.3, 490
See application file for complete search history.

(56) References Cited

U.S. PATENT DOCUMENTS

| | | | | | |
|---|---|---|---|---|---|
| 2,696,852 | A * | 12/1954 | Dunton | 144/250.18 |
| 2,739,625 | A * | 3/1956 | Peters | 83/425 |
| 2,985,202 | A * | 5/1961 | Wilson | 83/431 |
| 4,485,711 | A * | 12/1984 | Schnell | 83/425 |
| 4,603,612 | A * | 8/1986 | Atkins | 83/425 |
| 4,745,834 | A * | 5/1988 | Neumann | 83/468 |
| 5,018,562 | A | 5/1991 | Adams | |
| 5,205,198 | A * | 4/1993 | Foray et al. | 83/435.12 |
| 5,341,711 | A * | 8/1994 | Stay et al. | 83/425 |
| 5,662,019 | A * | 9/1997 | Denman | 83/425 |
| 5,779,407 | A * | 7/1998 | Tucker et al. | 409/218 |
| 5,894,777 | A * | 4/1999 | Sterling | 83/436.2 |
| 6,164,176 | A * | 12/2000 | Larsson | 83/435.12 |
| 6,481,477 | B1 * | 11/2002 | Szymanski et al. | 144/371 |
| 6,679,305 | B2 * | 1/2004 | Petersen | 144/253.1 |
| 7,040,206 | B2 * | 5/2006 | Wang | 83/436.2 |
| 2006/0248998 | A1 * | 11/2006 | Duginske | 83/468 |
| 2006/0266182 | A1 * | 11/2006 | Balolia | 83/471.3 |

FOREIGN PATENT DOCUMENTS

| | | |
|---|---|---|
| DE | 10 2005 024 111 | 8/2006 |
| DE | 10 2008 050 475 A1 | 4/2010 |
| EP | 1 238 762 | 9/2002 |
| GB | 185254 | 9/1922 |

OTHER PUBLICATIONS

PCT International Search Report issued in corresponding PCT Application No. PCT/US2011/047073 on Nov. 9, 2011.

* cited by examiner

*Primary Examiner* — Ghassem Alie
*Assistant Examiner* — Bharat C Patel
(74) *Attorney, Agent, or Firm* — Maginot, Moore & Beck

(57) ABSTRACT

A fence system for use on a power saw including an elongated fence configured to be secured on a top surface of a power saw at positions relative to a blade. The elongated fence has at least one flat side wall portion against which an object can be positioned and moved along while the object is moved through a cutting zone. A support unit is configured to ride on the fence and contact the object to move the object through the cutting zone. The support unit includes an ergonomically shaped hand pad, wherein the support unit is removably attached to the fence and movable along the length thereof. A movable arm is attached to the hand pad and is configured to extend downwardly to an elevation closely adjacent to the top surface.

23 Claims, 7 Drawing Sheets

FENCE SYSTEM FOR A POWER SAW

BACKGROUND OF THE INVENTION

The present invention generally relates to a fence system for power tools such as power saws.

Power table saws of the type which have a relatively flat table top and a blade that extends through a slot in the table saw typically have either a universal fence or a rip fence for guiding material to be cut, such as lumber, plywood and the like wherein the work piece is moved passed the saw blade with the fence guiding the work piece so that an accurate cut of the work piece can be accomplished. When the fence is placed close to the blade so that a narrow cut is made, a safety issue is presented because of the possibility of kickback of the work piece as well as close proximity of an operator's hand to the blade. In such situations, it is typical for the user to employ a push stick or other device to push the material through the cutting zone defined by the blade to prevent injuries. It is highly desirable to have a fence system which incorporates features that insure safety as well as provide convenience of use.

SUMMARY OF THE INVENTION

A fence system for use on a power saw that has a flat top surface and a saw blade extending through an opening in the top surface, the fence being configured for guiding and moving an object through a cutting zone that includes the saw blade, the fence system comprising an elongated fence configured to be secured on the flat top surface at various positions relative to the blade, the fence having at least one flat side wall portion against which material can be positioned and moved along while the material is moved through the cutting zone, a support unit configured to ride on the fence and contact the object to move it through the cutting zone, the unit comprising an ergonomically shaped hand pad, the unit being removably attached to the fence and movable along the length thereof and a movable arm attached to the hand pad that is configured to extend downwardly to an elevation closely adjacent to the top surface.

DETAILED DESCRIPTION

While there have been many designs and products that are intended to aid a user in sawing work pieces of all sizes and shapes, most are broadly described as push sticks or push devices that may or may not be effective from a safety standpoint, but are not particularly convenient or easy to use. Since most large area boards, such as standard plywood sheets and the like need to be pushed through a cutting zone defined as the area immediately adjacent to a rotating saw blade, such cuts are typically made with table saws that have an elongated fence that extends from the front of the table top to its rear.

Such fences are typically mounted on parallel rails that are attached adjacent to the front and rear faces or other structure near the table top. The rails enable the fence design to operate so that it can be moved to either side of the blade and locked at a desired position relative to the blade so that the work piece can be cut to a desired dimension.

When relatively large work pieces such as plywood sheets are to be cut on a table saw, it is often necessary to set up the cut so that the plywood will be independently supported beyond the front and beyond the rear of the saw. At the start of a cut, an operator may set up a support roller in the front of the table saw, and as the work piece moves through the cutting zone, it extends beyond the rear of the table and must be similarly supported as the cut is completed. Once the front edge of the work piece is on the table, a sliding work piece support unit mounted on the fence can be used to engage the work piece and push it through the cutting zone. The design and operation of the sliding support unit appreciably reduces the safety hazards associated with such cutting.

The support unit is flexible in its use and is configured to be slidably mounted on the rip fence and is configured for use in various applications. One of the advantages of the present invention is that an upper guard covering the saw blade does not have to be removed if the operator wishes to make a cut of relatively thin material. It also has the advantage of being positioned on either side of the saw blade without losing any of its functionality. Not only can the support unit be easily positioned along the length of the fence by sliding within an elongated slot in the top of the rip fence, it is also configured to be held captive within the slot so that any upward force that may be caused by a kickback or other unexpected movement will not separate the support unit from the rip fence. The support unit also moves the material along the fence in a manner whereby side forces that can affect the accuracy of the cut are not applied to the work piece. The support unit also has a design that enables it to be mounted on a fence so that the arm can be located on either side of the fence. This design feature is consistent with and desirable with the fence being capable of being located on either side of the blade.

Figure 1:
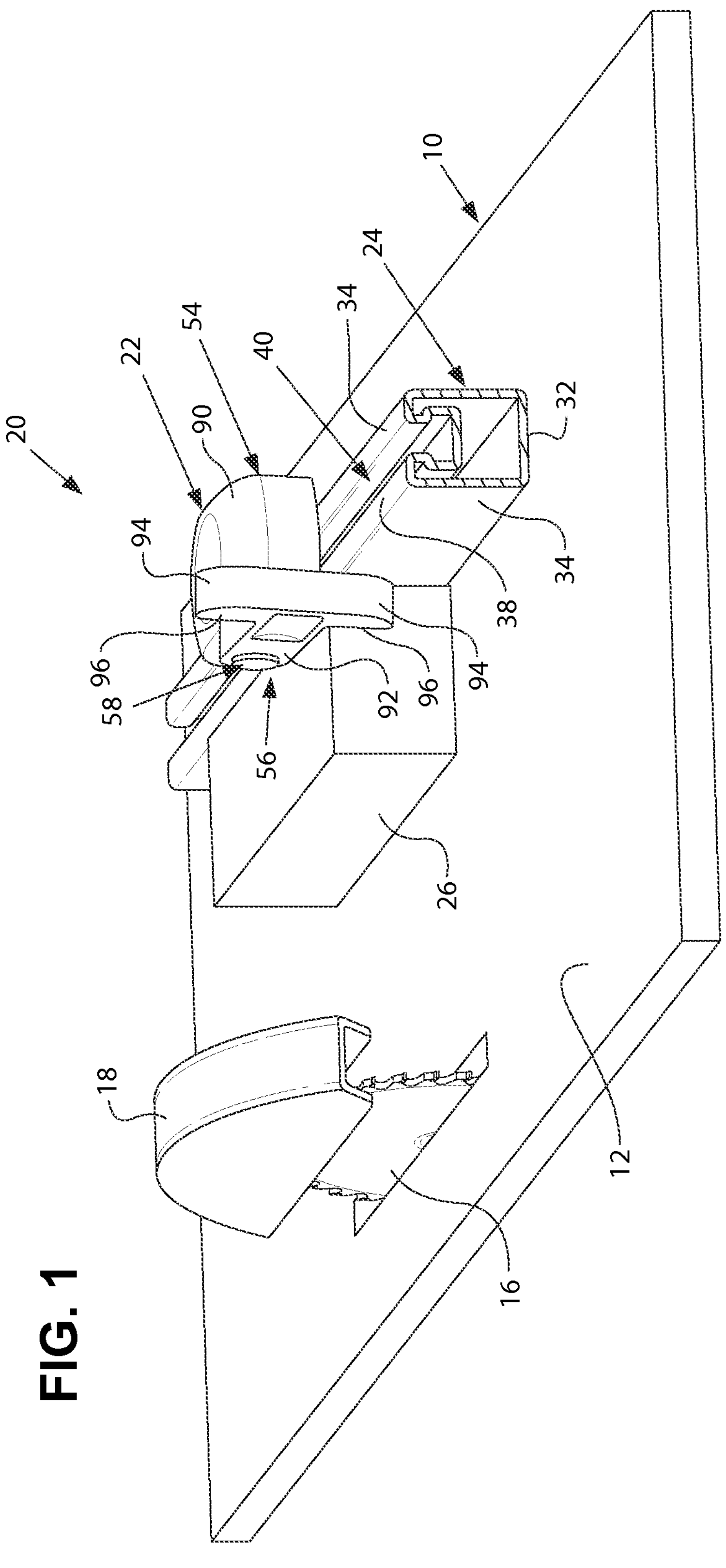
FIG. 1 is a left front perspective view of a fence system embodying the present invention shown on a portion of a table saw having a top and a blade, wherein the fence system has a support unit positioned to move a work piece along the fence.

Turning now to the drawings and particularly FIG. 1, a portion of a table saw, indicated generally at 10, is shown and has a top surface 12 in which a recess 14 is provided and through which a blade 16 extends, with the blade having a protected blade guard 18 shown above the blade. While the drawings particularly show a table saw, it should be understood that the present invention could be used with shapers and planers as well as other types of power tools that have a fence and where material to be cut or otherwise machined is moved to an operating zone where such processing occurs.

The fence system, indicated generally at 20, is shown on the table top 12 and includes a support unit, indicated generally at 22, as well as a portion of a fence, indicated generally at 24. The fence system is shown together with a work piece 26. As shown in FIGS. 1-4, a first preferred embodiment of the fence system 20 includes the support unit 22 and fence 24, with only a short portion of the fence 24 being illustrated. In this regard, it should be understood that the fence 24 would extend from a front edge 28 to a rear edge 30, with both ends of the fence 24 having structure which preferably engages front and rear rails (not shown) as well as a handle for clamping the fence 24 in a desired position.

As is conventional, such fences are adjustable along the length of the front and rear rails and are removable so that they can be placed on either side of the blade 16 and the distance between the fence and the blade is determinative of the width of a work piece that is being cut. The fence 24 is preferably an extruded metal, such as aluminum and is shown to have a flat bottom 32, opposite side walls 34 and 36, a top portion 38 which has an elongated slot 40 formed in the top and having downward inner extensions 42 with the slot 40 being defined by the opposed surfaces of the inner extensions 42. The extensions have transverse portions 44 that define a generally horizontal shoulders 46 that are connected to interior side walls 48 having a connecting bottom wall 50, with the side walls 48 and bottom wall 50 defining a cavity 52 in which a portion of the support unit is located.

With regard to the support unit 22, it is configured to ride on the elongated fence 24 and it has a hand pad, indicated generally at 54, to which a movable arm, indicated generally at 56, is pivotably attached by a pivot connection, indicated generally at 58. The pivot connection 58 has an exposed enlarged outer portion 60 and a reduced diameter portion 62 (see FIG. 4) that is preferably force fit or threaded into a corresponding opening in the hand pad 54 so as to provide a strong interconnection between the arm 56 and the hand pad 54.

Figure 4:
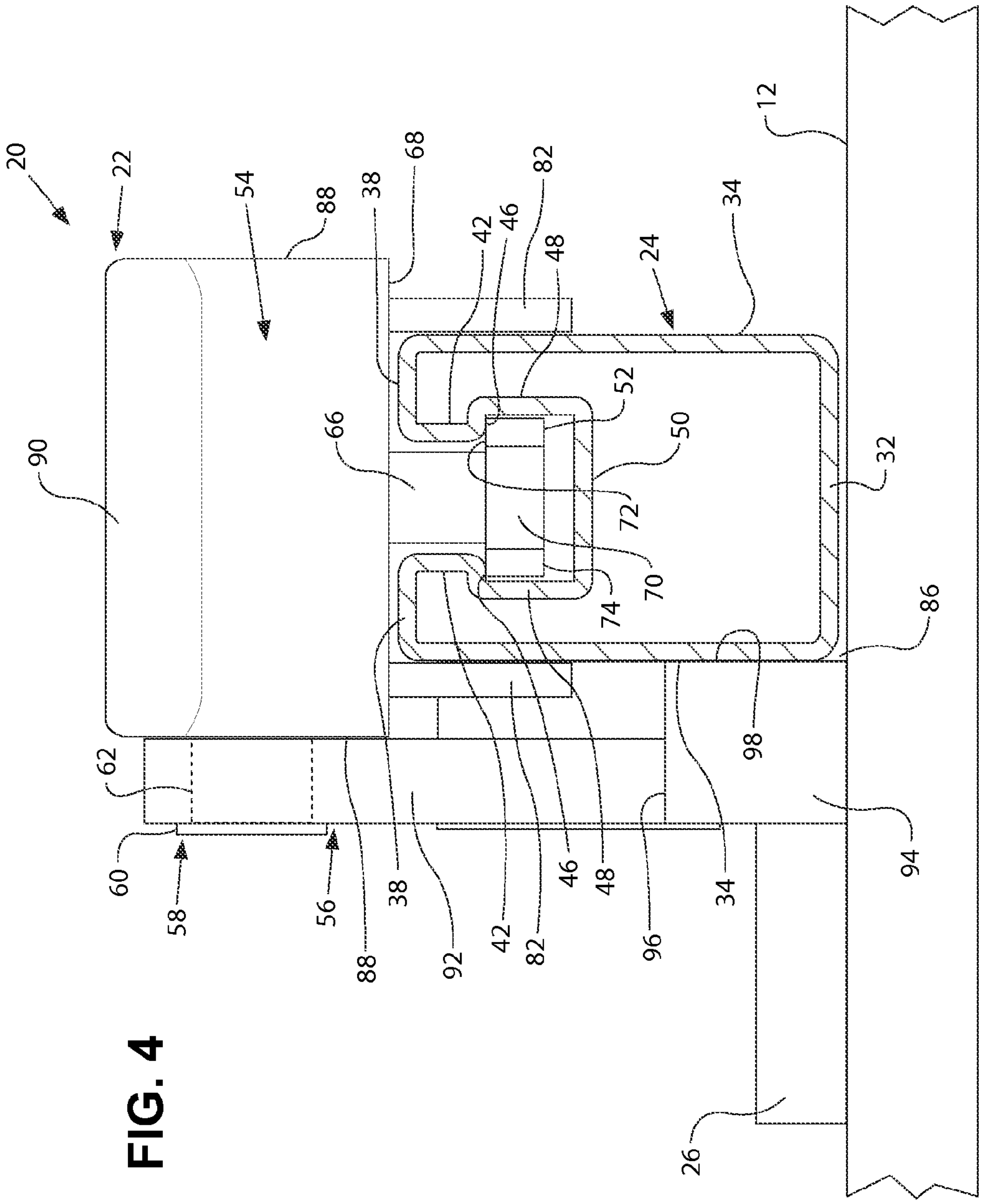
FIG. 4 is an end view, partially in section, showing the embodiment of FIG. 1, together with a thin work piece.

As is best shown in FIG. 4, the hand pad 54 has a lower extension 66 that is attached to a bottom surface 68 of the hand pad and it has an enlarged end portion 70 which is located in the cavity 52 when the support unit 22 is install on the fence 24. The enlarged end portion 70 has an upper surface 72 which is configured to engage the shoulders 46 so that it prevents the support unit 22 from moving upwardly and thereby holds the support unit 22 captive within the fence 24. The outer dimension is slightly smaller than the distance between the inner surfaces of the side walls 48 of the fence 24. Similarly, the outer dimension of the lower extension 66 is less than the distance between the outer surfaces of the downward inner extensions 42. The lower extension 66 with its enlarged end portion 70 is preferably a bolt with a hexagonal head that is threaded into a corresponding opening in the bottom surface 68 of the hand pad 54; however, other structure that is configured to engage the shoulders 46 may be used if desired.

Also, as best shown in FIG. 4, the bottom surface 68 of the hand pad 54 is shown to be out of contact with the top surface of the top portion 38 of the fence 24, with the upper surface 72 of the enlarged end portion 70 being in contact with the shoulder 46. The enlarged end portion 70 has a bottom surface 74 which should be sufficiently spaced from the bottom surface 50 to provide sufficient clearance so that the bottom surface 68 of the hand pad 54 can ride on the top portion 38 of the fence 24.

Figure 5:
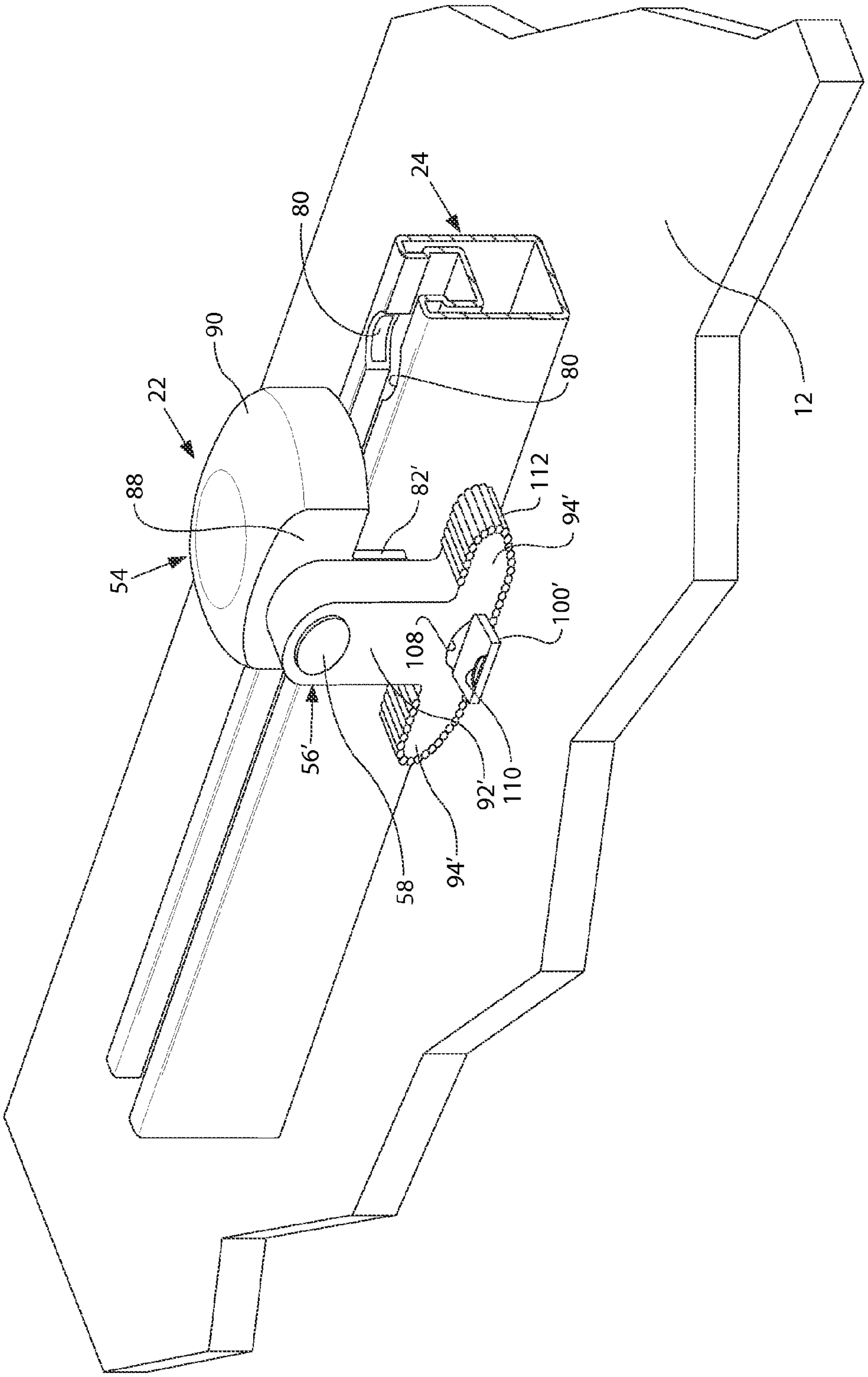
FIG. 5 is a front left perspective view, similar to FIG. 1, showing an alternative embodiment of the present invention.
Figure 6:
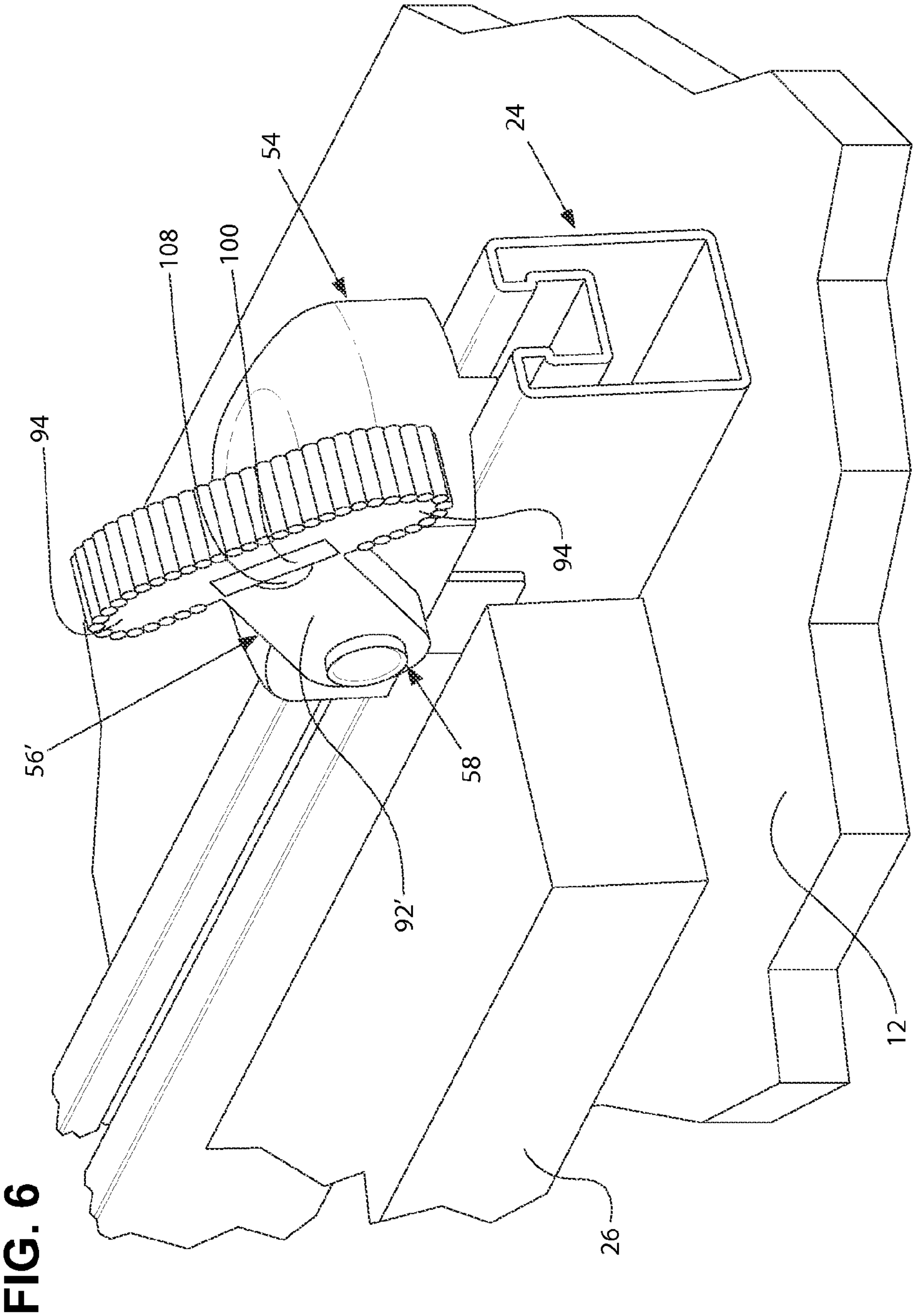
FIG. 6 is another view of the embodiment shown in FIG. 5, with the support unit pivotable arm in a raised position and with an auxiliary fence in a retracted position.
Figure 7:
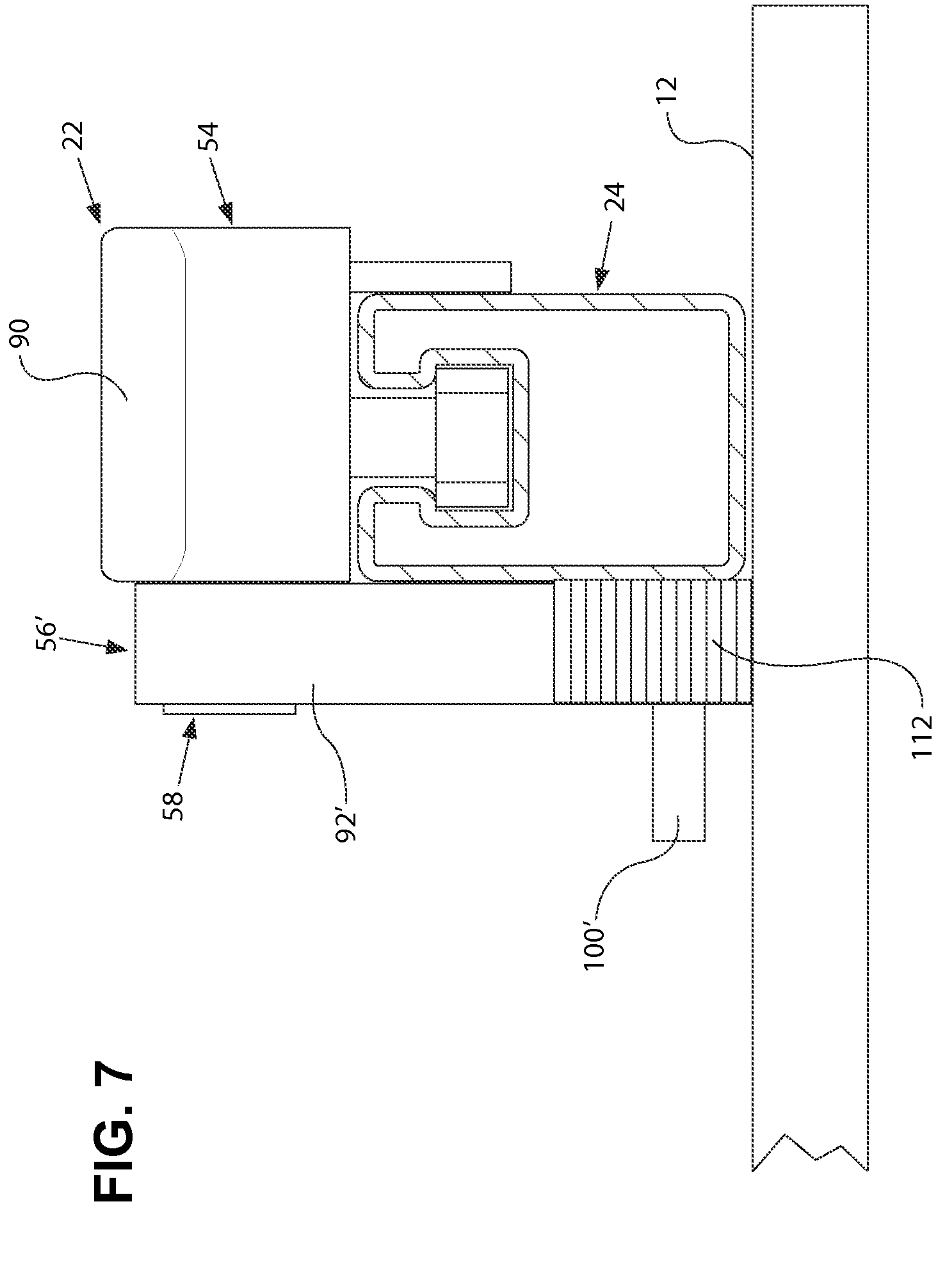
FIG. 7 is a front view, partially in section, illustrating the embodiment of FIG. 5, with the auxiliary fence in the extended position.

Since the fence 24 typically has clamping structure on the front end thereof as well as structure at the rear end for engaging rails or the like associated with the table top 12, the embodiment of FIGS. 1-4 preferably has a feature that is not shown in those figures, but which is shown in FIG. 5 of an alternative embodiment. In this regard, the structure of the fence has a curved recess 80 on the inside portion of the slot 40 that is sized to enable the enlarged end portion 70 to be inserted into the cavity 52. The structure of the fence 24 shown in FIGS. 5-7 is otherwise substantially similar to that shown in the embodiment of FIGS. 1-4.

Referring again to the hand pad 54 and FIG. 4, it preferably has downwardly extending guide plates that are configured to have their inside surfaces positioned closely adjacent to the side walls 34 to guide the support unit when the support unit 22 is pushed along the length of the fence 24. These guide plates may be integrally formed with the hand pad 54 or otherwise securely attached to the hand pad 54. In the configuration of FIGS. 1-4, the width of the hand pad 54 extends beyond the left side wall 34 and the width of the arm 56 is relatively narrow, but has a wide bottom portion that has an end surface 86 that is configured to engage the outer surface of the left fence side wall 34 to provide additional strength and stability to the arm during use. Similarly, the left and right surfaces 88 of the hand pad 54 are planar and the inside surface of the arm 56 is in close proximity to the left side surface 88 which provides stability against side forces. The top surface 90 of the hand pad 54 has a generally curved configuration that is shaped to ergonomically conform to the generally similarly curved configuration of a user's palm when the user pushes the support unit 22 along the fence 24.

The arm 56 has a stem portion 96 and a pair of transverse nose portions extending from the bottom of said stem portion, with each of the nose portions having an upper surface 96.

Figure 2:
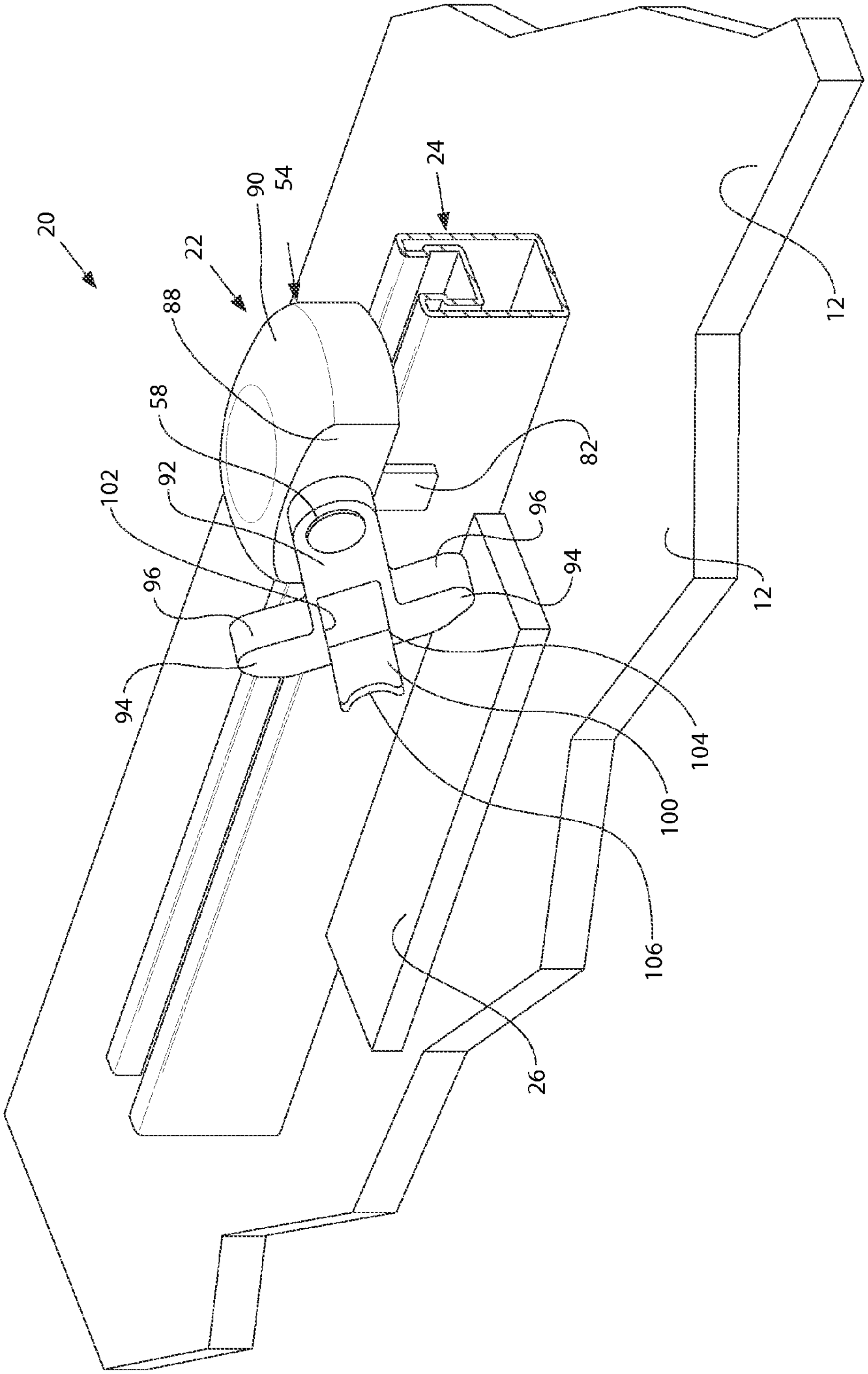
FIG. 2 shows another perspective view of the embodiments shown in FIG. 1, with the support unit in another position where a relatively thin work piece is being moved along the fence.
Figure 3:
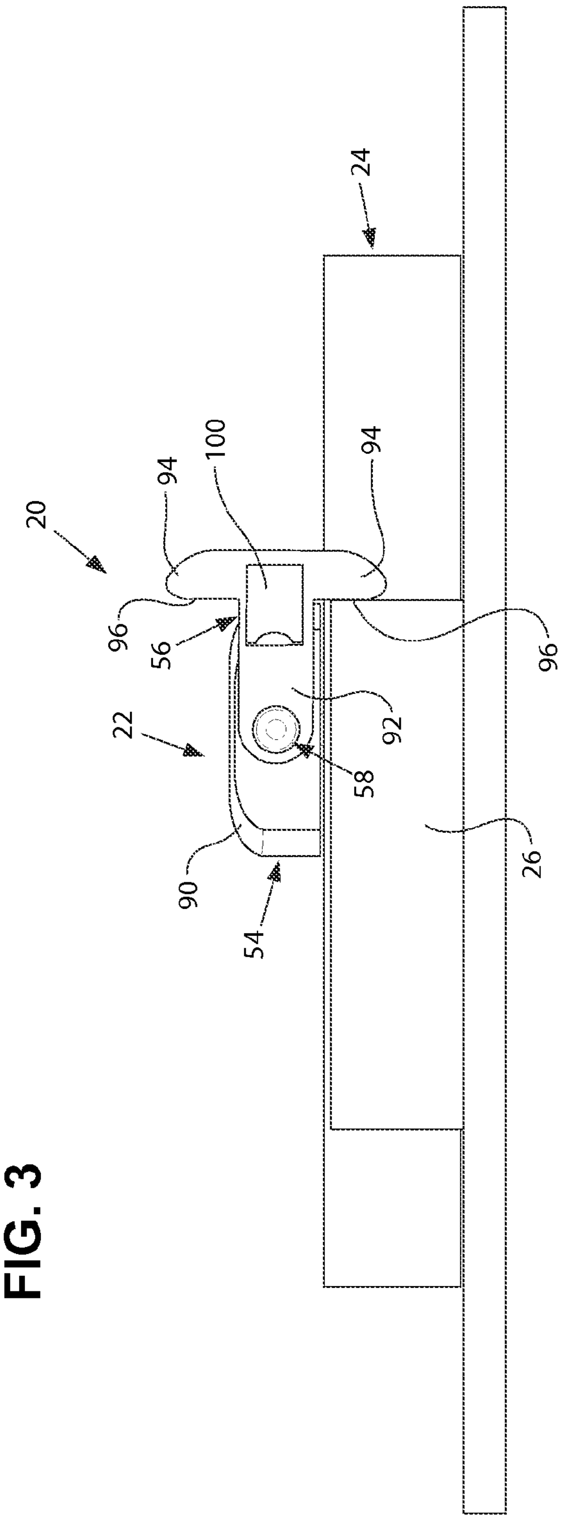
FIG. 3 is a side view of the embodiment shown in FIG. 1.

As is best shown in FIG. 2, the arm 56 has a thin auxiliary fence 100 that fits within a recess 102 that is hinged at its bottom end portion 104 that can be pivoted out into a transverse position for cutting thin work pieces. The outer end has a narrow recess 106 that enables a user to easily use his or her fingernail or other tool or the like to contact the outer end and pivot it downwardly into operating position.

During use, as shown in FIG. 1, the arm can be positioned so that the upper surface 96 of one of the nose pieces 94 can engage a work piece 26 so that it pulls the work piece 26 through a cutting zone. Alternatively, the arm can be placed so that the bottom surface of the nose can engage the top of the cutting zone and push it through.

With regard to the alternative embodiments shown in FIGS. 5-7, the identical reference numbers are used for this embodiment where they have a substantially similar configuration, with prime designations being given where the feature has been slightly modified. More particularly, the embodiment shown in FIGS. 5 and 6 have a preferably corrugated rubber layer 112 that extends from the top surface 96 of the nose portions 94 completely around the bottom of the stem portion 92' and is provided to enable the nose portions to prevent slippage of the nose portion 94 if it is placed in the position shown in FIG. 2, for example, and to also prevent the nose portions from work pieces that can be easily scratched. Also, the guide plate 82' is flush with the left surface 88 of the hand pad 54 to provide stability for the arm 56' which has a thicker stem portion 92 that is substantially the same as the width of the nose portions 94. The auxiliary fence 100' is also configured to fit within a recess having an enlarged curved portion 108 to enable a user to reach in and engage an elongated recess 110 so that it can be pulled out into operating position. While not shown, suitable structure of the auxiliary fence 100' is provided in the opening of the arm 56' so that the auxiliary fence cannot be completely removed.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A fence system for use on a power saw that has a flat top surface and a saw blade extending through an opening in the top surface, said fence system being configured for guiding and moving an object during a cutting operation through a cutting zone that includes the saw blade, said fence system comprising:

an elongated fence configured to be secured on the flat top surface at various positions relative to the blade, said fence having at least one flat side wall portion against which said object can be positioned and moved along while said object is moved through the cutting zone;

a support unit configured to ride on said fence and contact said object to move said object through the cutting zone, said unit comprising an ergonomically shaped hand pad, said unit being removably attached to said fence and being movable along the length thereof and a movable arm attached to said hand pad that is configured to extend downwardly to an elevation closely adjacent to the top surface, wherein said movable arm is configured to have a stem portion and a nose portion, said nose portion including a transverse first nose portion and a transverse second nose portion each extending outwardly from a first end of said stem portion, said movable arm having a pivot connection at a second end of said stem portion wherein said pivot connection defines a pivot axis, said first nose portion having a first pulling surface and a first pushing surface, wherein said first pulling surface is configured to be in contact with the object during the cutting operation and said second nose portion is configured to not be in contact with the object during the cutting operation.

2. The fence system as defined in claim 1 wherein said pivot connection has a pivot axis and a relatively large diameter to limit movement of said arm relative to said hand pad to rotation around said pivot connection.

3. The fence system as defined in claim 2 wherein said hand pad and said arm have adjoining flat surfaces adjacent to and perpendicular to said pivot connection for assisting said pivot connection in limiting movement of said arm to rotation around said pivot connection.

4. The fence system as defined in claim 2 wherein said arm has a length that is at least as long as the height of the fence.

5. The fence system as defined in claim 1 wherein said arm has a relatively thin auxiliary fence portion that is extendable from said first end of said stem portion.

6. the fence system as defined in claim 5 wherein said thin auxiliary fence portion is configured to fit within an opening in said stem portion and be slidably extended outwardly therefrom.

7. The fence system as defined in claim 5 wherein said thin auxiliary fence portion is configured to fit within a recess in said stem portion and have a second connection for pivoting said auxiliary fence portion outwardly therefrom.

8. The fence system as defined in claim 1 wherein at least one of said nose portions have a rubber or rubber-like material on at least the outer surface thereof which can contact a workpiece during cutting.

9. The fence system as defined in claim 1 wherein said fence has flat opposite side wall portions against which material can be positioned and a flat top portion, said top portion having an elongated slot in the top surface with a first predetermined width, a central cavity below said slot with an upper generally horizontal shoulder adjacent each side of said slot, said support unit having an elongated lower extension with an enlarged end portion, said lower extension having an outer dimension slightly smaller than the width of said slot, said enlarged end portion having an upper surface configured to be adjacent to said shoulders to limit upward movement of said support unit.

10. The fence system as defined in claim 9 wherein said lower extension is a bolt.

11. The fence system as defined in claim 9 wherein said support unit has a pair of downward guide extensions configured to engage said opposite side wall portions to facilitate movement of said support unit along the fence.

12. The fence system as defined in claim 11 wherein said hand pad comprises an upper surface of said support unit, said hand pad having a convex curvature that is configured to generally correspond to the shape of the palm of an operator's hand.

13. The fence system as defined in claim 1 wherein said fence is an extrusion made of metal.

14. The fence system as defined in claim 13 wherein said metal is aluminum.

15. The fence system as defined in claim 1 wherein said second nose portion includes a second pulling surface and a second pushing surface, wherein each of said first pulling surface and said second pulling surface are respectively spaced further away from said pivot axis than each of said first pulling surface and said second pulling surface.

16. The fence system as defined in claim 15 wherein said first pulling surface and said second pulling surface are disposed generally along a plane.

17. The fence system as defined in claim 16 wherein said first pushing surface includes a curved surface defining a tangent intersecting said plane.

18. The fence system as defined in claim 17 wherein said second pushing surface includes a curved surface defining a tangent intersecting said plane.

19. The fence system as defined in claim 1 wherein said first pulling surface and said second pulling surface are disposed generally along a plane and said first pushing surface and said second pushing surface each include a curved surface portion each defining a tangent intersecting said plane.

20. A support unit for use on a power saw that has a flat top surface and a saw blade extending through an opening in the top surface, and a fence configured for guiding and moving object material during a cutting operation through a cutting zone that includes the saw blade, the fence having flat opposite side wall portions against which material can be positioned and a flat top portion, the top portion having an elongated slot in the top surface with a first predetermined width, a central cavity below said slot with an upper generally horizontal shoulder adjacent each side of said slot, said support unit comprising:

an ergonomically shaped hand pad and an extension coupled to said ergonomically shaped hand pad, said extension being removably attached to the fence and movable along the length thereof and a movable arm attached to said hand pad that is configured to extend downwardly to an elevation closely adjacent to the top surface, wherein said movable arm is configured to have a stem portion and a nose portion, said nose portion including a transverse first nose portion and a transverse second nose portion each extending outwardly from a first end of said stem portion, said movable arm having a pivot connection at a second end of said stem portion wherein said pivot connection defines a pivot axis, said first nose portion having a first pulling surface and a first pushing surface, wherein said first pulling surface is configured to be in contact with the object during the cutting operation and said second nose portion is configured to not be in contact with the object during the cutting operation.

21. The support unit as defined in claim 20 wherein said support unit having an elongated lower extension with an enlarged end portion, said lower extension having an outer dimension slightly smaller than the width of said slot, said enlarged end portion having an upper surface configured to be adjacent to said shoulders to limit upward movement of said support unit.

22. The support unit as defined in claim 20 wherein said hand pad comprises an upper surface of said support unit, said hand pad having a convex curvature that is configured to generally correspond to the shape of the palm of an operator's hand.

23. The support unit as defined in claim 20 wherein said first pulling surface and said second pulling surface are disposed generally along a plane and said first pushing surface and said second pushing surface each include a curved surface portion each defining a tangent intersecting said plane.

* * * * *